United States Patent
Ansari

(10) Patent No.: US 11,803,251 B2
(45) Date of Patent: Oct. 31, 2023

(54) EFFICIENT COMMUNICATION SCHEME FOR SPLIT KEYBOARD

(71) Applicant: Atelier Polymath LLC, Claymont, DE (US)

(72) Inventor: Tarik Ansari, Brooklyn, NY (US)

(73) Assignee: ATELIER POLYMATH LLC, Claymont, DE (US)

( * ) Notice: Subject to any disclaimer, the term of this patent is extended or adjusted under 35 U.S.C. 154(b) by 0 days.

(21) Appl. No.: 17/333,768

(22) Filed: May 28, 2021

(65) Prior Publication Data

US 2021/0373675 A1 Dec. 2, 2021

Related U.S. Application Data

(60) Provisional application No. 63/031,567, filed on May 28, 2020.

(51) Int. Cl.
*G06F 3/023* (2006.01)
*G06F 13/42* (2006.01)
*G06F 3/02* (2006.01)

(52) U.S. Cl.
CPC .......... *G06F 3/0231* (2013.01); *G06F 3/0202* (2013.01); *G06F 13/4282* (2013.01); *G06F 2213/0042* (2013.01)

(58) Field of Classification Search
CPC .. G06F 3/0231; G06F 3/0202; G06F 13/4282; G06F 2213/0042; G06F 1/1683; G06F 3/0216; G06F 3/0227
See application file for complete search history.

(56) References Cited

U.S. PATENT DOCUMENTS

| 5,481,263 A | 1/1996 | Choi |
| 6,046,731 A * | 4/2000 | Griffin ................ G06F 3/0231 |
| | | 345/169 |

(Continued)

FOREIGN PATENT DOCUMENTS

| WO | WO-2018067166 A1 * | 4/2018 | ............. G06F 3/017 |
| WO | 2020007222 A1 | 1/2020 | |

OTHER PUBLICATIONS

"Mitosis Wireless Split Ergonomic Keyboard w/ Acrylic Case", advertised for sale and published on Flashquark website at the Internet domain address https://flashquark.com/product/gb-mitosis-wireless-split-ergonomic-keyboard-w-acrylic-case/ at least as early as Jan. 2019.

(Continued)

*Primary Examiner* — David Tung
(74) *Attorney, Agent, or Firm* — Haynes and Boone, LLP

(57) ABSTRACT

A split wireless keyboard for communicating with a host device includes first and second keyboard halves. Each keyboard half communicates wirelessly with the host device to communicate that a key has been depressed or released. The keyboard halves communicate wirelessly with each other to signal key status changes. The two keyboard halves alternate serving as master and slave depending upon which keyboard half has most recently detected a change of key status, and only the keyboard half designated as the master actively communicates with the host. Wireless communications among the two keyboard halves and the host may use Bluetooth short-range wireless technology protocol. One keyboard half initially pairs with the host, and then shares a wireless link key with the other keyboard half during a setup phase. A Y-shaped hardwired connection cable may be used to interconnect the two keyboard halves to the host device instead of using wireless communications.

11 Claims, 6 Drawing Sheets

(56) References Cited

U.S. PATENT DOCUMENTS

| | | | |
|---|---|---|---|
| 7,828,489 B1 | 11/2010 | Hargreaves | |
| 8,858,103 B2 | 10/2014 | Hargreaves | |
| 9,769,558 B2 | 9/2017 | Chandramohan | |
| 10,244,307 B1 | 3/2019 | Tong | |
| 2011/0286615 A1 | 11/2011 | Olodort | |
| 2016/0219358 A1 | 7/2016 | Shaffer | |
| 2018/0164897 A1* | 6/2018 | Huang | G06F 1/1669 |
| 2019/0155779 A1* | 5/2019 | Dropps | G06F 13/4282 |

OTHER PUBLICATIONS

2014 Kinesis Freestyle2 Blue for PC Quick Start Guide, published by Kinesis Corporation of Bothell, WA, dated and published Sep. 7, 2014.

2018 Kinesis FreestylePro User Manual, published by Kinesis Corporation of Bothell, WA, dated and published Apr. 20, 2018.

"Its Just Awesome—Dygma Raise Split Gaming Keyboard Review", published online May 28, 2020, at the Internet domain address https://hardwarecanucks.com/gaming-keyboards-mice/dygma-raise-split-review/, Hardware Canucks by Dmitry, Video Producer.

* cited by examiner

EFFICIENT COMMUNICATION SCHEME FOR SPLIT KEYBOARD

CROSS-REFERENCE TO RELATED PATENT APPLICATIONS

The present application claims the benefit of the earlier filing date of U.S. provisional patent application No. 63/031,567, filed on May 28, 2020, entitled "EFFICIENT WIRELESS COMMUNICATION SCHEME FOR SPLIT KEYBOARDS PAIRS", the contents of which are hereby incorporated by reference as if fully contained herein.

BACKGROUND OF THE INVENTION

Technical Field

The present application generally relates to split keyboards for use with a host device such as a computer, tablet, or smartphone, wherein a conventional keyboard is split into separable left and right halves, and more particularly, to a split keyboard system wherein the left and right halves more efficiently communicate with each other and with the host device.

State of the Art

Split keyboards offer ergonomic and creative positioning advantages compared to single-board computer keyboards. However, most incarnations of split keyboards include a first cable joining the split halves to each other, plus a second cable from one of such split halves to the host computer or other host device, rendering the use of such split keyboards rather cumbersome. Some partially-wireless split keyboards interface wirelessly with the host device, but still require a physical cable extending between the left half and right half of the split keyboard; at least some of these split keyboards also require a special receiver module which needs to be plugged into a USB port of the host device.

Applicant is aware of at least one commercially-available "full wireless" split keyboard which does not require any cables or wires to interconnect the left half with the right half, nor any cables to interconnect either the left half or the right-half with the host device. This commercially available split keyboard employs a wireless scheme for effecting communication between the two halves, with one half acting as a "master", and the other half acting as a slave. Only the designated "master" half communicates with the host device. This master-to-host implementation was selected, at least in part, to permit transmission of "key combinations" without requiring the need for special software within the host computer; avoidance of the need for special software is particularly desirable when the host device is a tablet or a smartphone and device drivers cannot always easily be installed by the user. An example of a "key combination" would include a user wishing to type the capital (upper case) letter "O"; in this case, the user would typically depress the "Shift" key located on the left side of a user's keyboard (using the user's left hand) while also depressing the "o" key located on the right side of a user's keyboard (using the user's right hand). However, the requirement for one half of the split keyboard to always serve as the master, and the other half of the split keyboard to always serve as the slave, presents disadvantages. For example, it introduces an electronic delay when keys are depressed or released on the slave half before such key activity is recognized by the host device. In addition, the slave half (e.g., the left half) may not be used without the master right half, even though it is common, in such applications as gaming for example, to use the left half alone, along with a mouse, to control the functions of a game.

SUMMARY OF THE INVENTION

It is therefore an object of the present invention to provide a split keyboard, including left and right halves, which may be used efficiently to communicate with a host device.

Another object of the present invention is to provide such a split keyboard which may be efficiently operated in an entirely wireless mode, with no cables or wires extending between the split keyboard halves themselves, and with no cables or wires extending between the host device and either of the split halves of the keyboard.

Still another object of the present invention is to provide such a split keyboard wherein the host device can recognize a change in key activity on either of the split halves without any additional delay.

Yet another object of the present invention is to provide such a split keyboard which does not require insertion of a receiver device within an external port of the host device in order to communicate wirelessly with the split halves of the split keyboard.

A further object of the present invention is to provide such a split keyboard wherein both of the split halves of the split keyboard can communicate directly with the host device.

A still further object of the present invention is to provide such a split keyboard wherein the host device is essentially oblivious to whether the left half or the right half of the split keyboard is currently serving as the master half, and wherein the host device communicates with the split keyboard as essentially a single integrated device.

These and other objects of the present invention will become more apparent to those skilled in the art as the description of the present invention proceeds.

Briefly described, and in accordance with various embodiments thereof, a first aspect of the present invention relates to a split wireless keyboard for communicating with a host device, such as a laptop computer, tablet, smartphone, or the like. The split wireless keyboard includes a first keyboard half and a second keyboard half. The first keyboard half includes a first series of keys and at least one wireless transceiver; the at least one wireless transceiver of the first keyboard half is adapted to communicate with the host device that there has been a change of key status, i.e., that one of the first series of keys has been depressed or released. The at least one wireless transceiver of the first keyboard half is also adapted to communicate with the second keyboard half to signal that one of the first series of keys has been depressed or released.

Similarly, the second keyboard half includes a second series of keys and at least one wireless transceiver; the at least one wireless transceiver of the second keyboard half is adapted to communicate with the host device that there has been a change of key status, i.e., that one of the second series of keys has been depressed or released. The at least one wireless transceiver of the second keyboard half is also adapted to communicate with the first keyboard half to signal that one of the second series of keys has been depressed or released.

The first keyboard half further includes control logic responsive to depression, and responsive to release, of one of the first series of keys for enabling the at least one wireless transceiver of the first keyboard half to communicate such change of key status with the host device. Likewise, the second keyboard half includes control logic responsive to depression, and responsive to release, of one of the second series of keys for enabling the at least one wireless transceiver of the second keyboard half to communicate such change of key status with the host device.

The control logic of the first keyboard half is responsive to depression, and responsive to release, of one of the second series of keys (in the second keyboard half) for temporarily disabling the at least one wireless transceiver of the first keyboard half from communicating with the host device, at least until one of the first series of keys is either depressed or released. Similarly, the control logic of the second keyboard half is responsive to depression, and responsive to release, of one of the first series of keys (in the first keyboard half) for temporarily disabling the at least one wireless transceiver of the second keyboard half from communicating with the host device, at least until one of the second series of keys is either depressed or released. Thus, at a given point in time, only one of the at least one wireless transceivers of the first and second keyboard halves is enabled to communicate with the host device.

In various embodiments, the at least one wireless transceiver of the first keyboard half, and the at least one wireless transceiver of the second keyboard half, are each adapted to communicate with the host device using a Bluetooth short-range wireless technology protocol (e.g., Bluetooth Low Energy). Similarly, the at least one wireless transceiver of the first keyboard half, and the at least one wireless transceiver of the second keyboard half, may communicate with each other using the same Bluetooth short-range wireless technology protocol.

In some embodiments of the invention, the split keyboard engages in an initial setup phase wherein one of the two keyboard halves (e.g., the first keyboard half) is adapted to engage in a pairing operation with the host device to obtain a Link Key, also known as a security key. The first keyboard half then communicates the Link Key (security key) to the second keyboard half. Thereafter, each of the first and second keyboard halves may alternately communicate with the host device, and from the perspective of the host device, the two keyboard halves appear to be one and the same device.

In various embodiments, the present invention also relates to a method of interfacing a split wireless keyboard with a host device, wherein the split wireless keyboard includes a first keyboard half and a second keyboard half. In practicing such method, wireless communication paths are established between the first keyboard half and the second keyboard half for sharing information therebetween, between the first keyboard half and the host device, and between the second keyboard half and the host device. Initially, one of the first and second keyboard halves is established as a "master" keyboard half; the other keyboard half is initially established as the "slave" keyboard half. The wireless communication path between the master keyboard half and the host device is enabled, while the wireless communication path between the slave keyboard half and the host device is disabled. Nonetheless, the wireless communication path between the first keyboard half and the second keyboard half remains active.

Upon detecting that a key on the first keyboard half has been depressed or released, the first keyboard half is designated as the master keyboard half, and the second keyboard half is designated as the slave keyboard half. The first keyboard half communicates updated key status information to the host device over the wireless communication path between the first keyboard half and the host device. On the other hand, upon detecting that a key on the second keyboard half has been depressed or released, the second keyboard half is designated as the master keyboard half, the first keyboard half is designated as the slave keyboard half. The second keyboard half communicates updated key status information to the host device over the wireless communication path between the second keyboard half and the host device.

In various embodiments of practicing the aforementioned method of interfacing a split wireless keyboard with a host device, the wireless communication path established between the first keyboard half and the second keyboard half uses a Bluetooth short-range wireless technology protocol.

Similarly, in various embodiments of practicing the aforementioned method of interfacing a split wireless keyboard with a host device, the wireless communication paths established between each of the first keyboard half and the second keyboard half and host device use a Bluetooth short-range wireless technology protocol.

In various embodiments, the aforementioned method of interfacing a split wireless keyboard with a host device includes initial setup steps, including paring the first keyboard half with the host device to obtain a Link Key (or security key), and transmitting the Link Key from the first keyboard half to the second keyboard half.

In an alternate embodiment, the present invention provides a split keyboard system for efficiently communicating with a host device. The split keyboard system includes a first keyboard half having a first plurality of keys and including a first USB port, as well as a second keyboard half having a second plurality of keys and including a second USB port. The split keyboard system also includes a USB connection cable having a Y-shaped configuration and including: i) a first connector for engaging the first USB port of the first keyboard half; ii) a second connector for engaging the second USB port of the second keyboard half; and iii) a third connector for engaging a USB port of the host device. The first keyboard half includes control logic for detecting that a key on the first keyboard half has been depressed or released, and in response thereto, communicates updated key status information to the host device over the USB connection cable. Likewise, the second keyboard half includes control logic for detecting that a key on the second keyboard half has been depressed or released, and in response thereto, communicates updated key status information to the host device over the USB connection cable.

In some embodiments of the invention, the USB connection cable of the aforementioned split keyboard system includes a first leg coupled to the first connector, a second leg coupled to the second connector, and a third leg coupled to the third connector. The USB connection cable further includes a control module for processing and combining key status information received from the first and second keyboard halves, and allows such combined key status information to be accessed by the host device.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

DETAILED DESCRIPTION

Figure 1:
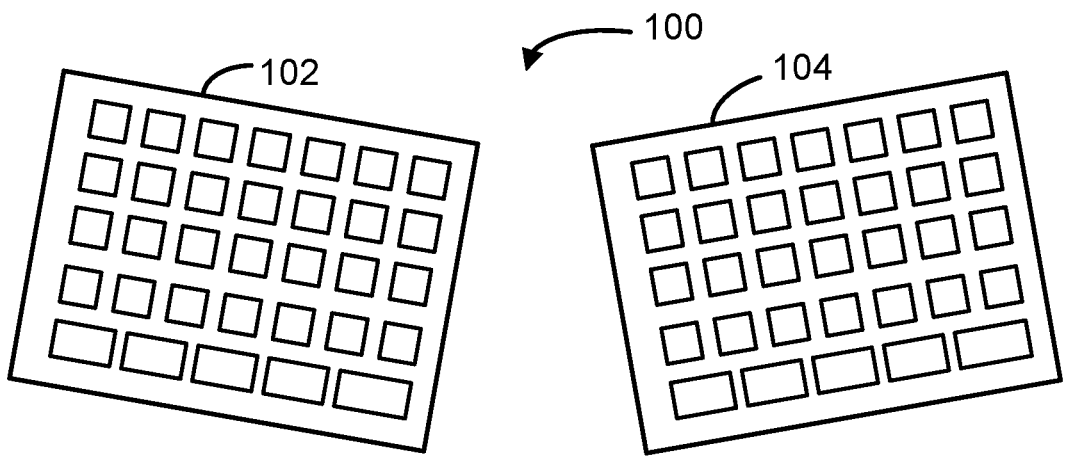
FIG. 1 is a simplified view of a split keyboard including a left half and a right half.

As shown in FIG. 1, a split keyboard 100 includes a left keyboard half 102 and a right keyboard half 104. Left keyboard half 102 includes a first series of keys, e.g., those keys found on the left side of a conventional QWERTY keyboard. Right keyboard half 104 includes a second series of keys, e.g., those keys found on the right side of a conventional QWERTY keyboard. Preferably, left keyboard half 102 and right keyboard half 104 each include a charging port (not shown in FIG. 1) for recharging storage batteries therein.

Figure 2:
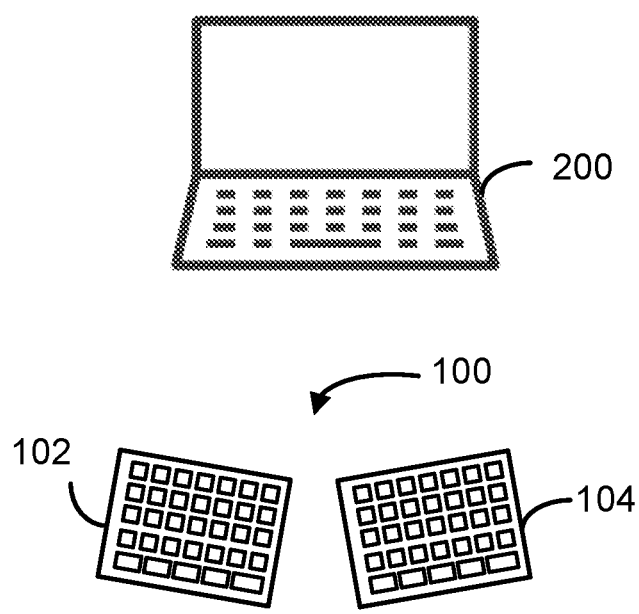
FIG. 2 illustrates the use of the split keyboard of FIG. 1 in use with a host laptop computer in one embodiment which is fully wireless.

Turning to FIG. 2, the split keyboard 100 is shown together with host device 200. In this case, host device 200 is a laptop computer. Alternatively, host device 102 could be a computer-based tablet, a smartphone, or any other computing device adapted to communicate with peripheral devices. The objective for the configuration shown in FIG. 2 is to allow host device 200 to interface with split keyboard 100 in essentially the same manner as it would with a single-board (non-split) keyboard.

In a first embodiment shown in FIG. 2, split keyboard 100 is entirely wireless. Left keyboard half 102 can communicate wirelessly with host device 200, and right keyboard half 104 can communicate wirelessly with host device 200. For reasons to be further explained below, it may also be desired that left keyboard half 102 and right keyboard half 104 be able to communicate with each other; in the embodiment of FIG. 2, left keyboard half 102 and right keyboard half 104 wirelessly communicate with each other.

Figure 3:
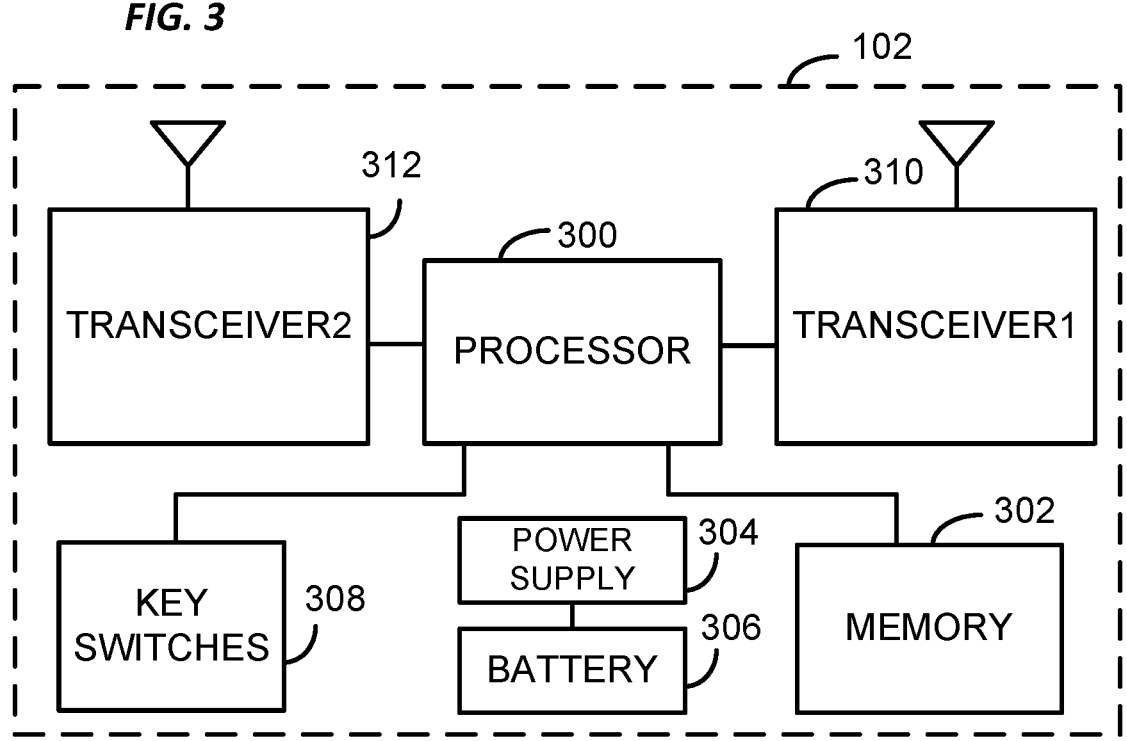
FIG. 3 is a block diagram showing the basic internal components within each half of the split keyboard of FIGS. 1 and 2.

Now referring to FIG. 3, the basic functional components of left keyboard half 102 include processor 300, memory 302, power supply 304, storage battery 306, key switches 308, a first transceiver 310 and a second transceiver 312. Those skilled in the art will appreciate that the description of the FIG. 3 also applies to the basic functional components of right keyboard half 104, as well. Key switches 308 correspond to the electrical switches operated when one or more of the first series of keys on left keyboard half 102 is depressed or released. Processor 300, under the control of firmware stored in memory 302, monitors key switches 308 to detect any changes in key status, i.e., that a new key has been depressed or that a previously depressed key has been released. Storage battery 306 may be a rechargeable low-voltage battery that can be recharged, for example, via an external USB port provided on the housing of left keyboard half 102. Power supply 304 may be interposed between battery 306 and the other power-consuming components of left keyboard half 102 to provide a stable regulated working voltage. Processor 300 together with memory 302 form control logic for controlling the transmission of information from left keyboard half 102, and for processing information received by left keyboard half 102.

Still referring to FIG. 3, left keyboard half 102 includes at least one wireless transceiver for transmitting and receiving information. For purposes of simplifying the explanation of the operation of left keyboard half 102, FIG. 3 includes two such wireless transceivers 310 and 312. Transceiver 310 may be used to wirelessly exchange information with a similar transceiver of right keyboard half 104. Transceiver 312 can be considered for use in exchanging information between left keyboard half 102 and the host device 200. In actual implementation, processor 300, memory 302 and transceivers 310/312 may be combined into a single low-power system-on-chip ("SOC"), for example, the SOC commercially available from Nordic Semiconductor of Trondheim, Norway under Part Number nRF5340. In this case, transceivers 310 and 312 can be effectively provided by a single transceiver (e.g., a Bluetooth low energy radio transceiver) adapted to communicate with two or more distinct sources independently and essentially concurrently with each other. Modern Bluetooth chips usually support two or more concurrent links using a single miniature antenna.

Figure 4:
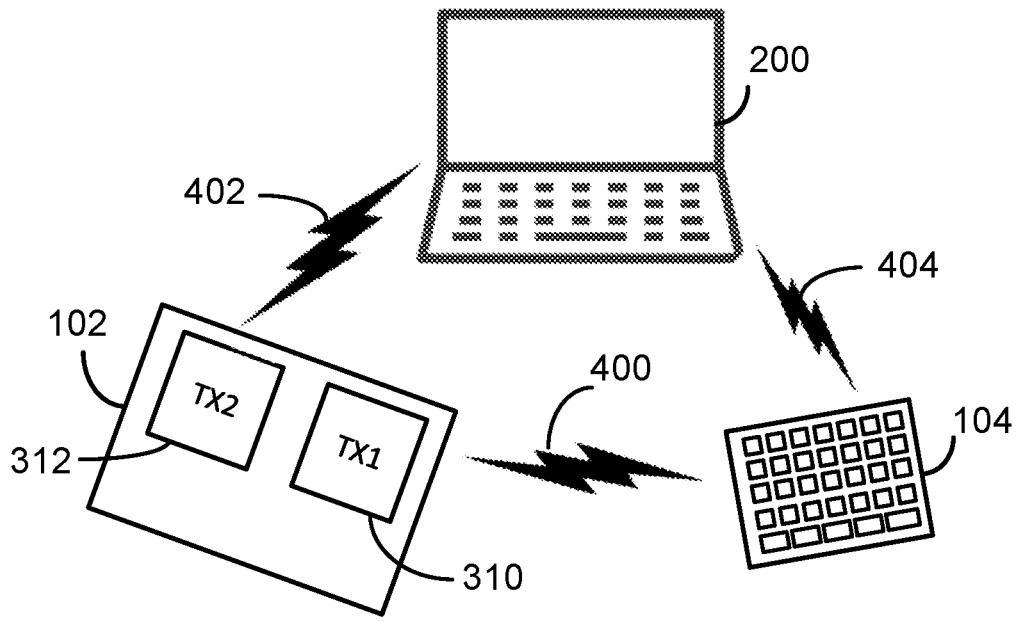
FIG. 4 is similar to FIG. 2 but shows first wireless transmissions between Transceiver1 (TX1) of the left half of the split keyboard and the mating right half, as well as second wireless transmissions between Transceiver2 (TX2) of the left half of the split keyboard and the host computer.

Turning to FIG. 4, the various wireless paths established between left keyboard half 102, right keyboard half 104, and host device 200 are illustrated. Radio link 400 corresponds to the wireless communication path extending between transceiver 310 of left keyboard half 102 and a similar transceiver within right keyboard half 104. It is this communication path by which processor 300 signals to right keyboard half 104 that one of key switches 308 has been depressed or released. Likewise, radio link 400 is the communication path, used in reverse, by which right keyboard half 104 signals to left keyboard half 102 that one of its keys has been depressed or released.

Radio link 402 of FIG. 4 corresponds to the wireless communication path extending between transceiver 312 of left keyboard half 102 and host device 200; this path might be used, for example, for allowing left hand keyboard 102 to signal host device 200 that one of its keys has either been depressed or released. Similarly, radio link 404 corresponds to the wireless communication path extending between a transceiver within right keyboard half 104 and host device 200; this path might be used, for example, for allowing right hand keyboard 104 to signal host device 200 that one of its keys has either been depressed or released.

Figure 5A:
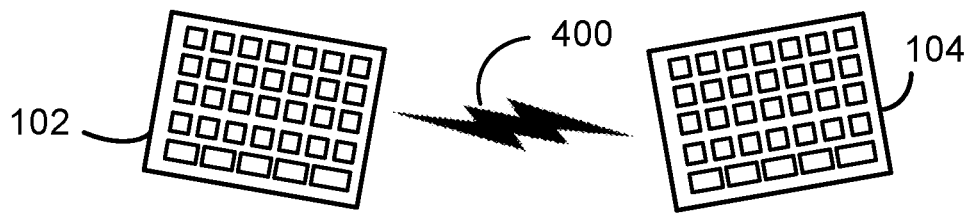
FIGS. 5A, 5B and 5C illustrate a sequential setup protocol wherein the two halves of the split keyboard are initially paired with each other, the right half is paired with the host computer, and the right half then shares such pairing information with the left half, respectively.

While any number of wireless communication schemes may be used to implement the present invention (including WiFi, infrared, cellular, etc.), Applicant has found that use of the Bluetooth short-range wireless technology protocol for achieving the described wireless communication paths 400, 402 and 404 (see FIG. 4) works very well, including the so-called Bluetooth Low Energy/Bluetooth 5.2 protocols. For security purposes, two devices which are to communicate via Bluetooth must be "paired" with each other, as by exchanging a security key or "link key". Thus, before the left keyboard half and the right keyboard half can wirelessly communicate with each other, they must first be "paired" with each other. This initial pairing step is illustrated in FIG. 5A. Either of left keyboard half 102 or right keyboard half 104 may initiate a pairing request with the other keyboard half over wireless path 400. Since the two keyboard halves are sold as a pair, this initial pairing step could be performed by the manufacturer before the split keyboard is packaged for sale. However, it might still be necessary for a user to repeat this initial pairing operation, as when one of the keyboard halves is lost or becomes inoperative, and must be replaced.

Figure 5B:
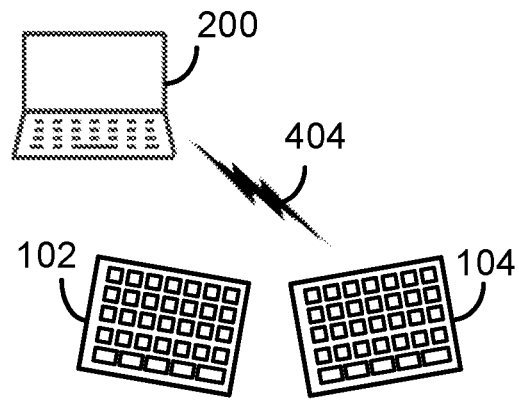
Figure 5C:
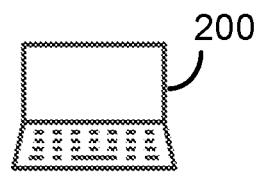
Figure 5C:
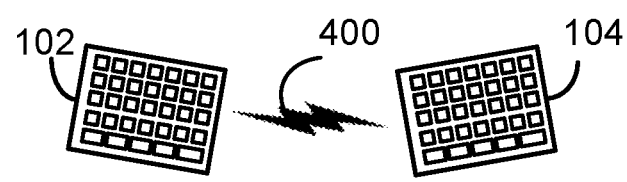

After the left and right keyboard halves are paired with each other, the split wireless keyboard must be paired to the host device. This pairing process is accomplished in two steps shown in FIGS. 5B and 5C, respectively. First, in FIG. 5B, one of the two keyboard halves, in this case, right keyboard half 104, initiates a pairing request with host device 200 over communication path 404. When right keyboard half 104 completes the pairing process with host device 200, right keyboard half 104 has obtained the security key, or "link key", authenticating further communications between right keyboard half 104 and host device 200. The next step, shown in FIG. 5C, is for right keyboard half 104 to transmit to left keyboard half 102, the security key obtained during the pairing operation shown in FIG. 5B. Now that both keyboard halves have both stored the security key authenticating communications with host device 200, the left and right keyboard halves 102 and 104 may take turns wirelessly communicating with host device 200. Host device 200 is not able to distinguish which of the two keyboard halves is communicating with it; from the perspective of host device 200, it is communicating with a single peripheral device, i.e., a single-board keyboard.

An important objective in successfully communicating between each of the left and right keyboard halves and the host device in a wireless scenario is to ensure that only of the two keyboard halves is attempting to communicate with the host device at any given time. This avoids data collision at the host device. One way to accomplish this objective is to designate one of the keyboard halves as a master half, designate the other keyboard half as the slave, and to impose a rule that only the master half is enabled to communicate with the host device. The designation of master and slave, as between the two keyboard halves, can be alternated, depending upon which keyboard half needs to communicate with the host device. Initially, before any keys are depressed on either keyboard half, either of the two keyboard halves may be arbitrarily designated as the master. The rule imposed by Applicant relative to master/slave designation is that the keyboard half for which a key was most recently depressed or most recently released is the keyboard half that is designated as the master. Once a keyboard half is designated as the master half, it keeps that designation until the next key change occurring on the other keyboard half.

Returning to FIG. 3 momentarily, the control logic including processor 300 and memory 302 of the left keyboard half 102 is responsive to depression, and responsive to release, of one of the key switches 308. Upon detecting a change in key status in key switches 308, processor 300 declares left keyboard half 102 to be the master, and enables wireless transceiver 312 to communicate with host device 200. The purpose of such communication is to advise host device 200 of the changed key status on the master half as well as the current key status of the slave half; this is one of the reasons that each keyboard half must save key status changes communicated by the other keyboard half. Thus, when the current master keyboard half transmits to host device 200, it provides the complete state (i.e., keys depressed) on the master half as well as the current state (i.e., keys depressed) on the slave half.

At the same time, processor 300 activates transceiver 310 to notify right keyboard half 104 of the nature of the key status change detected (i.e., which key or keys were depressed or released, and to notify right keyboard half 104 that left keyboard half 102 has now assumed the role of master. The corresponding control logic within right keyboard half 104 recognizes that it has now been relegated to the status of the slave and temporarily disables wireless communications between right keyboard half 104 and host device 200. The corresponding control logic in right keyboard half 104 also updates its memory of the status of the keys in both the right and left keyboard halves.

Those skilled in the art will appreciate that the control logic within right keyboard half 104 operates in the same manner as that described for left keyboard half 102. If the control logic within right keyboard half 104 detects a change in key status for one of the keys on right keyboard half 104, then such control logic declares that the right keyboard half shall now serve as the master half, enables its transceiver to communicate with host device 200, and notifies left keyboard half 102 that right keyboard half 104 has now assumed the role of master. The control logic within left keyboard half 104 recognizes that it has now been relegated to the status of the slave and temporarily disables wireless communications between left keyboard half 102 and host device 200. The control logic in left keyboard half 102 also updates its memory of the status of the keys in both the right and left keyboard halves.

Figure 6A:
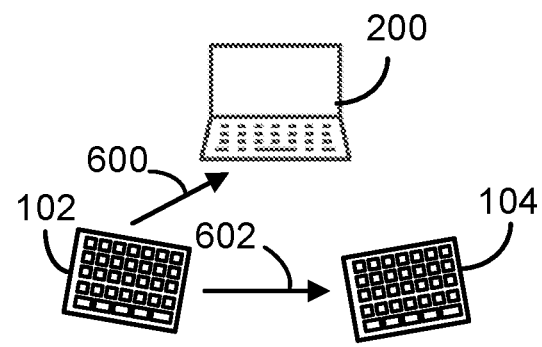
FIGS. 6A, 6B, 6C and 6D sequentially demonstrate how the left half and right half of the split keyboard exchange roles as "master" and "slave" as different keys are depressed or released by a user.

The master-slave protocol described above can be better understood by reference to FIGS. 6A through 6D. In FIG. 6A, left keyboard half 102 has detected that the user has depressed the Shift key associated with left keyboard half 102. Accordingly, left keyboard half 102 declares itself to be the master, and enables its wireless communication path to host device 200 for communicating the depression of such Shift key to host 200, as represented by arrow 600. Left keyboard half 102 also transmits to right keyboard half 104 that such Shift key has been depressed, and that left keyboard half 102 has accordingly assumed the role of master, as represented by arrow 602.

Figure 6B:
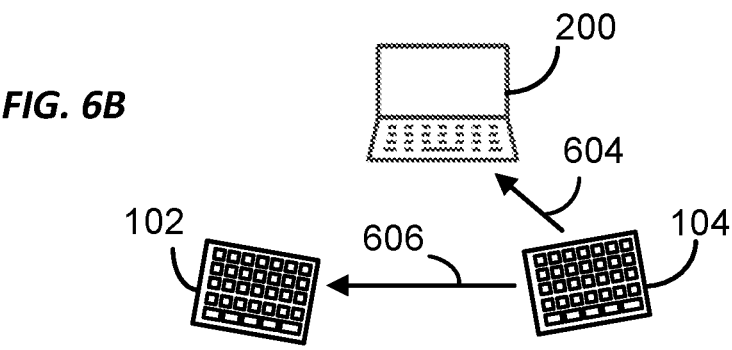

Next, in FIG. 6B, right keyboard half 104 detects that the user has depressed the key for the letter "o" on the right keyboard half (i.e., the user is trying to type the capital letter "O"). Accordingly, right keyboard half 104 now declares itself to be the master, and enables its wireless communication path to host device 200 for communicating the depression of such "o" key to host 200, as represented by arrow 604. Right keyboard half 104 also transmits to left keyboard half 102 that such "o" key has been depressed, and that right keyboard half 104 has accordingly assumed the role of master, as represented by arrow 606.

Figure 6C:
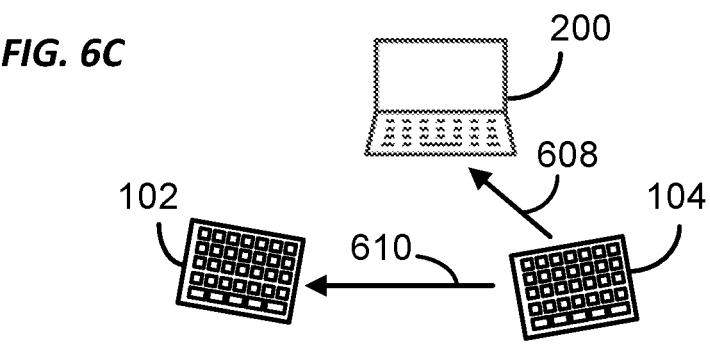

Next, in FIG. 6C, right keyboard half 104 detects that the user has now released the key for the letter "o" on the right keyboard half (i.e., the user has finished typing the capital letter "O"). The right keyboard half 104 already has the role of master, and it retains that role. The wireless communication path from right keyboard half 104 to host device 200 remains enabled, and the release of the "o" key is communicated to host 200, as represented by arrow 608. Right keyboard half 104 also transmits to left keyboard half 102 that the "o" key has now been released, as represented by arrow 610. Left keyboard half 102 had already been delegated to be the slave, and that status continues.

Figure 6D:
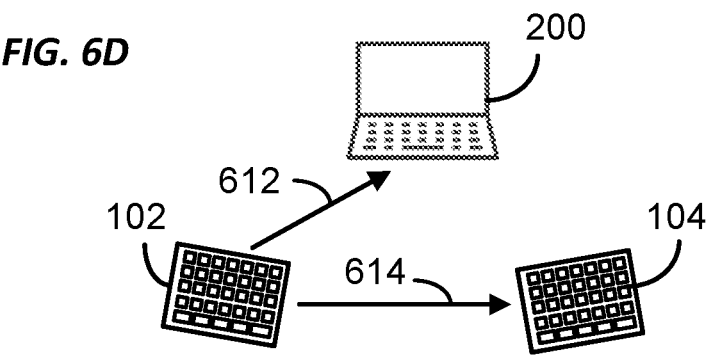

Finally, in FIG. 6D, left keyboard half 102 has detected that the user has released the Shift key associated with left keyboard half 102. Accordingly, left keyboard half 102 again declares itself to be the master, and enables its wireless communication path to host device 200 for communicating the release of such Shift key to host 200, as represented by arrow 612. Left keyboard half 102 also transmits to right keyboard half 104 that such Shift key has been released, and that left keyboard half 102 has again assumed the role of master, as represented by arrow 614.

As noted above, each keyboard half includes a processor and firmware within memory to form control logic for controlling the operation of each such keyboard half. To better understand the steps performed by such control logic, reference is now made to the simplified flowchart of FIG. 10, which illustrates the control flow within right keyboard half 104. From Start point 1000, control flows to pairing operation 1002 for processing a request to pair the left keyboard half with right keyboard half, as represented by FIG. 5A; as mentioned above, this is an operation that could be performed by the manufacturer before shipping the split keyboard for sale. Control then flows to block 1004 for pairing right keyboard half to host 200, as indicated in FIG. 5B, for obtaining the required security key. Control then flows to block 1006 for initiating a transmission of the security key obtained from host device 200 to left keyboard half 102, as represented by FIG. 5C.

Figure 10:
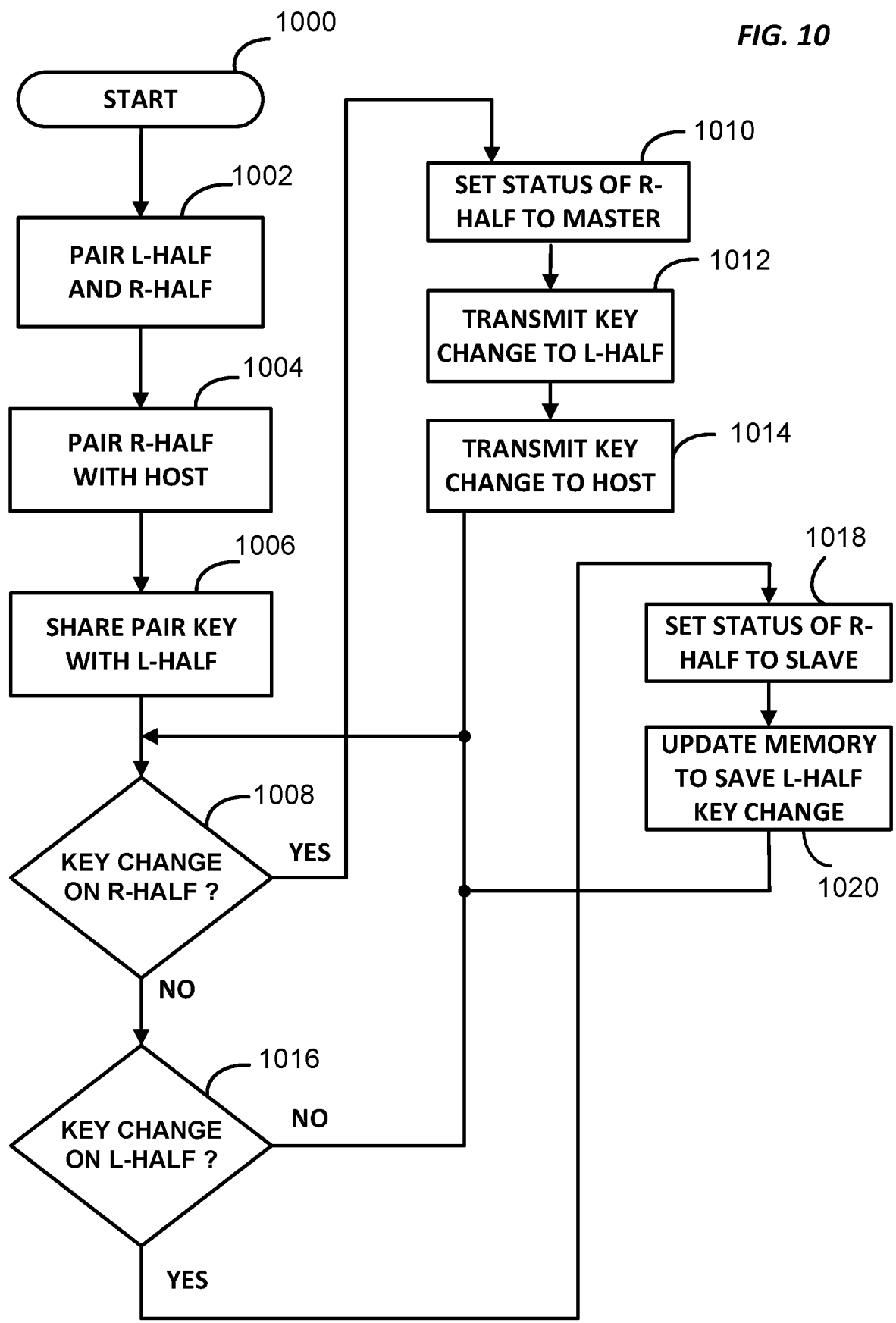
FIG. 10 is a simplified flow chart showing the steps performed by the processor within the right half of the split keyboard for the embodiment illustrated in FIGS. 2 and 3.

Still referring to FIG. 10, control flows to decision box 1008 for determining whether a key status change has been detected on the right keyboard half 104. If so, control flows to block 1010 for designating the right keyboard half 104 as the master. Next, block 1012 transmits such key status change information to left keyboard half 102, both to inform left keyboard half 102 that it has now been relegated to slave status, and to inform left keyboard half 102 of the nature of such key status change so that left keyboard half 102 can store such information. Next, block 1014 transmits such key status change information to host device 200. Control then loops back to decision box 1008 for awaiting a further key change.

Still referring to decision box 1008, if no such key change is detected within right keyboard half 104, then control flows to decision box 1016 for checking whether any new transmission has been received from left keyboard half indicating that key status has changed in the left keyboard half 102. If not, then control loops back to decision box 1008. However, if the answer to decision box 1016 is "yes", then control flows to block 1018, and right keyboard half changes its status to being the slave; one of the consequences of this is that right keyboard half temporarily disables further communications between it and host device 200. Next, control flows to block 1020 for allowing right keyboard half 104 to store the key change status information received from the left keyboard half 102. Control then loops back to decision box 1008 for awaiting a further key change.

While some wireless keyboards transmit data only in one direction, i.e., from the keyboard to the host device, a two-way link is preferred. Many keyboards are designed to be able to receive data from the host to update display indicators for caps-lock status, num-lock status, etc. Moreover, when Bluetooth is used as the wireless protocol, two-way communications are necessary for pairing. Two-way communications may also be needed for certain advanced features, e.g., remapping keys on programmable keyboards.

It should be noted that some Bluetooth modes allow for so-called "frequency hopping" to avoid interference with conflicting frequency transmissions. In the event that any such frequency hops are negotiated between the host device and the current master keyboard half, the master keyboard half can share such updates with the slave keyboard half using the wireless communication link existing between the two keyboard halves.

The wireless communication path between the two keyboard halves can also be used to share other information such as the battery charge state of the battery for such keyboard half. If desired, the keyboard half serving as the master can share the battery status of both keyboard halves with the host device. In this case, the user might install a software application on the host device to interpret such data and display it on a user interface to show the user the battery status of the batteries in each of the keyboard halves.

Those skilled in the art may appreciate that there is a theoretical possibility that keys might be depressed (or released) at precisely the same time, or within the same host device sampling interval, an occurrence sometimes called "overtalk". If both keyboard halves attempted to communicate with host device 200 at the same time, then the host device would flag such communication as an error. Overtalk is inherently rare in this scenario, as the host device typically samples the keyboard status at least 125 times per second. on each of the keyboard halves. Were this to take place, the keyboard half that is currently designated as the master would have priority for communicating its key status change first. On the next host device sampling interval, the master-slave roles would be reversed, and the former slave keyboard half would be able to communicate its changed key status to the host device.

Figure 7:
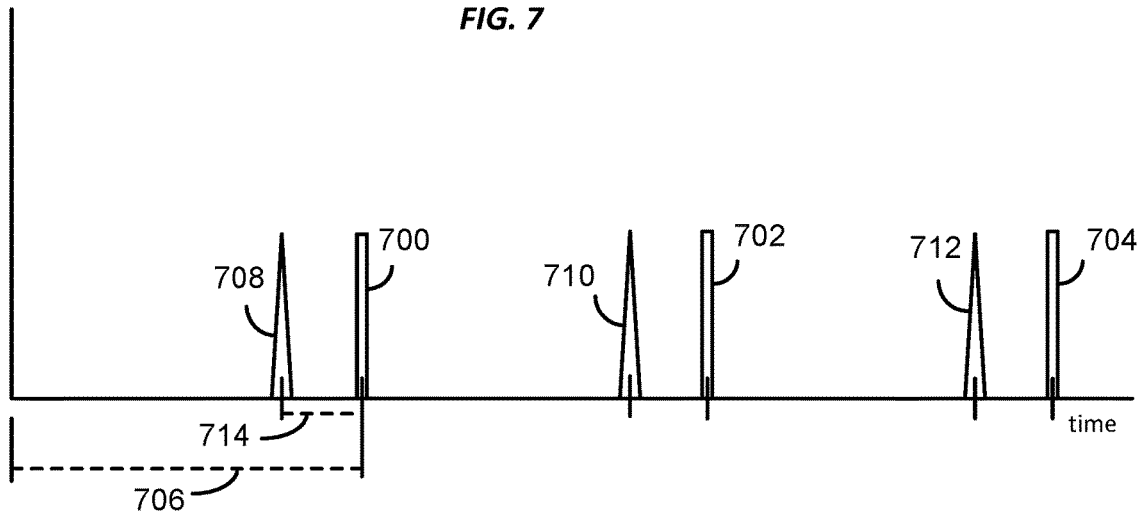
FIG. 7 is a timing waveform graph illustrating host sampling rate intervals versus cutoff times for changing the master/slave roles of the left and right halves of the split keyboard.

Referring now to the timing diagram of FIG. 7, the sample polling rate of the host device is indicated by pulses 700, 702 and 704, occurring consecutively at the interval indicated by dashed line 706. Just ahead of each such sampling pulse is a cutoff waveform 708, 710 and 712, respectively. The cutoff waveform represents the cutoff point after which any further detected key status changes are deferred until the following sampling interval. A minimum amount of interpretation time, indicated by dashed line 714, is required for the master keyboard half to be prepared to communicate with host device 20 as each sampling interval comes to its close. Thus, while each sampling interval might be as much as $\frac{1}{125}^{th}$ of a second, overtalk is only an issue if it occurs during that portion of sampling interval 706 that does not overlap with interpretation time 714.

Figure 8:
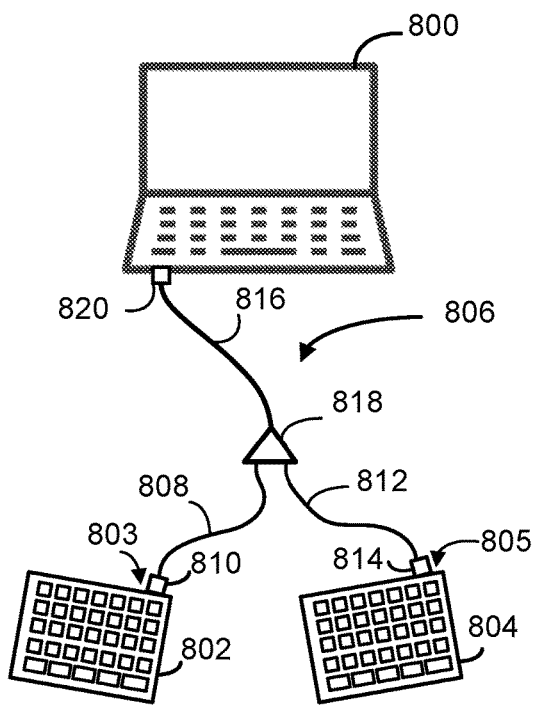
FIG. 8 shows an alternate embodiment wherein a Y-cable is used to interconnect the left half and the right half of the split keyboard to the host computer.

FIG. 8 illustrates an alternate embodiment of a split keyboard system for communicating with a host device. In FIG. 8, a first (left) keyboard half 802 has a first series of keys and includes a first USB port 803. A second (right) keyboard half 804 has a second series of keys and includes a second USB port 805. A Y-shaped USB connection cable is designated generally by reference numeral 806 and includes a first leg 808 terminating in a first USB connector 810 for engaging USB port 803 of left keyboard half 802. Y-shaped USB connection cable 806 also includes a second leg 812 terminating in a second USB connector 814 for engaging USB port 805 of right keyboard half 804. Y-shaped USB connection cable 806 also includes a third leg 816 terminating in a third USB connector 820 for engaging a USB port of host device 800. In addition, Y-shaped USB connection cable 806 includes a central control module 818 for to which first leg 808, second leg 812, and third leg 816 are each connected.

Figure 9:
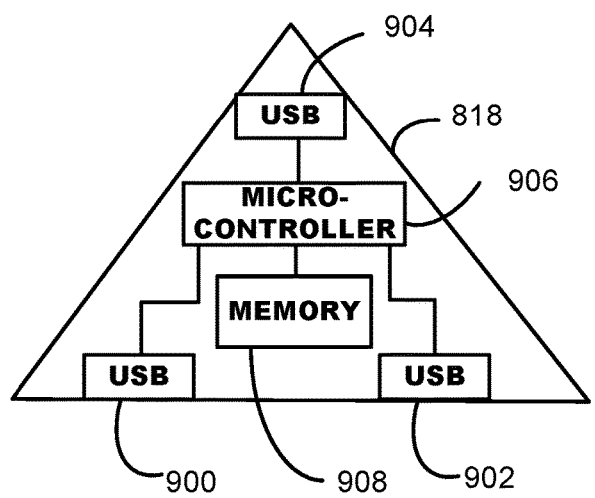
FIG. 9 is a simplified block diagram of the central control module of the Y-shaped cable shown in FIG. 8.

Referring briefly to FIG. 9, central control module 818 includes a first USB port 900 for first leg 808 of Y-cable 806, a second USB port 902 for second leg 812 of Y-cable 806, and a third USB port 904 for third leg 816 of Y-cable 806. Central module 818 also includes a microcontroller 900 and associated memory 902 (or alternatively, a system-on-a-chip) for sending and receiving information conveyed by USB ports 900, 902 and 904. Central module 818 is configured to function as a USB host for each of the keyboard halves 802 and 804. Control module 818 processes and combines key status information received from first and second keyboard halves 802 and 804, and allows such combined key status information to be accessed by host device 800 via third leg 816. Host device 800 perceives such combined key status information the same way that it would if a single-board keyboard peripheral had been connected to the USB port of host device 800.

Referring again to FIG. 8, left keyboard half 802 may include control logic for detecting that one of its keys has been depressed or released, and in response thereto, communicates updated key status information to control module 818 over first leg 808. Similarly, right keyboard half 804 may include control logic for detecting that one of its keys has been depressed or released, and in response thereto, communicates updated key status information to control module 818 over second leg 812. Control module 818 combines such information for the two keyboard halves and relays the combined information over third leg 816 to host device 800. Host device 800 does not require any special drivers to process or interpret the information provided to it by control module 818.

Control module 818 thus presents a virtual, full keyboard to host device 800 combining both keyboard halves. Y-cable 806 may also be used to charge rechargeable batteries within keyboard halves 802 and 804. If desired, e.g., during gaming usage, one of the two keyboard halves may be omitted, leaving only one of the two keyboard halves plus a mouse to control the game. Further advantages of the use of Y-cable 806 shown in FIG. 8 is that each of the keyboard halves requires only a single USB port (prior art systems sometimes require that at least one of the keyboard halves provide two USB ports); that the two keyboard halves have relatively equal access to control module 806, avoiding any lag time for one keyboard half relative to the other; and legs 808 and 812 allow for relatively easy adjustment of the physical placement of the two keyboard halves relative to each other (prior art systems are often burdened by a relatively short interconnecting cable extending directly between the two keyboard halves).

Those skilled in the art will appreciate that an improved apparatus and method have now been described for implementing, in one embodiment, a fully-wireless split keyboard for communicating with a host device. The two keyboard halves can alternate serving in the roles of master and slave in a manner which allows both keyboard halves to alternately communicate with the host device, while the host device perceives that it is communicating with a single peripheral device. The wireless communication path extending between the two keyboard halves allows the two keyboard halves to efficiently switch between their respective master and slave roles.

In addition, those skilled in the art will appreciate that, in an alternate embodiment, a split keyboard system has been described for communicating with a host device and employing a unique USB connection cable having a Y-shaped configuration and incorporating a central control module for coupling the two keyboard halves to the host device in a more efficient manner as compared to known split keyboard systems employing a hard-wired connection between the host device and the split keyboard halves.

The embodiments specifically illustrated and/or described herein are provided merely to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

I claim:

1. A split wireless keyboard for communicating with a host device and comprising a first keyboard half and a second keyboard half wherein:
   a. the first keyboard half includes:
      i. a first plurality of keys;
      ii. at least one wireless transceiver;
      iii. wherein the at least one wireless transceiver of the first keyboard half is adapted to communicate with the host device that one of said first plurality of keys has either been depressed or released; and
      iv. wherein the at least one wireless transceiver of the first keyboard half is adapted to communicate to the second keyboard half that one of said first plurality of keys has either been depressed or released;
   b. the second keyboard half includes:
      i. a second plurality of keys;
      ii. at least one wireless transceiver;
      iii. wherein the at least one wireless transceiver of the second keyboard half is adapted to communicate with the host device that one of said second plurality of keys has either been depressed or released; and
      iv. wherein the at least one wireless transceiver of the second keyboard half is adapted to communicate to the first keyboard half that one of said second plurality of keys has either been depressed or released;
   c. the first keyboard half further includes control logic responsive to depression, and responsive to release, of one of the first plurality of keys for enabling the at least one wireless transceiver of the first keyboard half to communicate with the host device that one of said first plurality of keys has either been depressed or released, the control logic of the first keyboard half is responsive to depression, and responsive to release, of one of the second plurality of keys in the second keyboard half for disabling the at least one wireless transceiver of the first keyboard half from communicating with the host device until one of the first plurality of keys is either depressed or released; and
   d. the second keyboard half further includes control logic responsive to depression, and responsive to release, of one of the second plurality of keys for enabling the at least one wireless transceiver of the second keyboard half to communicate with the host device that one of said second plurality of keys has either been depressed or released, the control logic of the second keyboard half is responsive to depression, and responsive to release, of one of the first plurality of keys in the first keyboard half for disabling the at least one wireless transceiver of the second keyboard half from communicating with the host device until one of the second plurality of keys is either depressed or released.

2. A split wireless keyboard for communicating with a host device and comprising a first keyboard half and a second keyboard half wherein:
   a. the first keyboard half includes:
      i. a first plurality of keys;
      ii. first control logic;
      iii. a first memory storage; and
      iv. a first wireless transceiver adapted to communicate with the host device and adapted to communicate with the second keyboard half;
   b. the second keyboard half includes:
      i. a second plurality of keys;
      ii. second control logic
      iii. a second memory storage; and
      iv. a second wireless transceiver adapted to communicate with the host device and adapted to communicate with the first keyboard half;
   c. the first control logic being responsive to depression, and responsive to release, of one of the first plurality of keys for causing the first wireless transceiver to communicate to the second wireless transceiver key status information characterizing the status of the first plurality of keys for the first keyboard half;
   d. the second control logic being responsive to depression, and responsive to release, of one of the second plurality of keys for causing the second wireless transceiver to communicate to the first wireless transceiver key status information characterizing the status of the second plurality of keys for the second keyboard half;
   e. the first memory storage saving key status information characterizing the status of the second plurality of keys for the second keyboard half;
   f. the second memory storage saving key status information characterizing the status of the first plurality of keys for the first keyboard half;
   g. the first control logic being responsive to one of said first plurality of keys being depressed or released for causing the first wireless transceiver to communicate to the host device key status information including:
      i. key status information characterizing the status of the first plurality of keys for the first keyboard half; and
      ii. key status information stored in the first memory characterizing the status of the second plurality of keys for the second keyboard half;
   h. the second control logic being responsive to one of said second plurality of keys being depressed or released for causing the second wireless transceiver to communicate to the host device key status information including:
      i. key status information characterizing the status of the second plurality of keys for the second keyboard half; and
      ii. key status information stored in the second memory characterizing the status of the first plurality of keys for the first keyboard half.

3. The split wireless keyboard of claim 2 wherein, at a given point in time, only one of the at least one wireless transceivers of the first and second keyboard halves is enabled to communicate with the host device.

4. The split wireless keyboard of claim 2 wherein:
   a. the at least one wireless transceiver of the first keyboard half is adapted to communicate with the host device using a Bluetooth short-range wireless technology protocol; and
   b. the at least one wireless transceiver of the second keyboard half is adapted to communicate with the host device using the Bluetooth short-range wireless technology protocol.

5. The split wireless keyboard of claim 4 wherein the at least one wireless transceiver of the first keyboard half, and the at least one wireless transceiver of the second keyboard half, communicate with each other using a Bluetooth short-range wireless technology protocol.

6. The split wireless keyboard of claim 4 wherein, during a setup phase:
   a. the first keyboard half is adapted to engage in a pairing operation with the host device to obtain a Link Key; and
   b. the first keyboard half is adapted to communicate the Link Key to the second keyboard half.

7. The split wireless keyboard of claim 2 wherein the at least one wireless transceiver of the first keyboard half, and the at least one wireless transceiver of the second keyboard half, communicate with each other using a Bluetooth short-range wireless technology protocol.

8. A method of interfacing a split wireless keyboard with a host device, the split wireless keyboard including a first keyboard half and a second keyboard half, the method comprising the steps of:
   a. establishing a wireless communication path between the first keyboard half and the second keyboard half for sending information from the first keyboard half to the second keyboard half, and for sending information from the second keyboard half to the first keyboard half;
   b. establishing a wireless communication path between the first keyboard half and the host device;
   c. establishing a wireless communication path between the second keyboard half and the host device;
   d. initially establishing one of the first and second keyboard halves as a master keyboard half and establishing the other of the first and second keyboard halves as a slave keyboard half;
   e. enabling the wireless communication path between the master keyboard half and the host device, while disabling the wireless communication path between the slave keyboard half and the host device;
   f. detecting that a key on the first keyboard half has been depressed or released, and in response thereto, communicating updated key status information from the first keyboard half, along the wireless communication path between the first keyboard half and the second keyboard half, to the second keyboard half, designating the first keyboard half as the master keyboard half, designating the second keyboard half as the slave keyboard half;
   g. storing in the second keyboard half the updated key status information communicated by the first keyboard half to the second keyboard half;
   h. detecting that a key on the second keyboard half has been depressed or released, and in response thereto, communicating updated key status information from the second keyboard half, along the wireless communication path between the first keyboard half and the second keyboard half, to the first keyboard half, designating the second keyboard half as the master keyboard half, designating the first keyboard half as the slave keyboard half;

i. storing in the first keyboard half the updated key status information communicated by the second keyboard half to the first keyboard half;

j. wherein step f. includes the step of communicating updated key status information from the first keyboard half to the host device over the wireless communication path between the first keyboard half and the host device, such updated key status information characterizing the status of both the first plurality of keys for the first keyboard half as well as the status of the second plurality of keys for the second keyboard half; and k. wherein step h. includes the step of communicating updated key status information from the second keyboard half to the host device over the wireless communication path between the second keyboard half and the host device, such updated key status information characterizing the status of both the second plurality of keys for the second keyboard half as well as the status of the first plurality of keys for the first keyboard half.

9. The method of claim 8 wherein the wireless communication path established between the first keyboard half and the second keyboard half uses a Bluetooth short-range wireless technology protocol.

10. The method of claim 8 wherein a. the wireless communication path established between the first keyboard half and the host device uses a Bluetooth short-range wireless technology protocol; and b. the wireless communication path established between the second keyboard half and the host device uses a Bluetooth short-range wireless technology protocol.

11. The method of claim 10 including a setup step comprising:

a. paring the first keyboard half with the host device to obtain a Link Key; and b. transmitting the Link Key from the first keyboard half to the second keyboard half.

\* \* \* \* \*